United States Patent
Kelly et al.

(10) Patent No.: US 10,652,247 B2
(45) Date of Patent: May 12, 2020

(54) SYSTEM AND METHOD FOR USER AUTHORIZATION IN A VIRTUAL DESKTOP ACCESS DEVICE USING AUTHENTICATION AND AUTHORIZATION SUBSYSTEMS OF A VIRTUAL DESKTOP ENVIRONMENT

(71) Applicant: DELL PRODUCTS, LP, Round Rock, TX (US)

(72) Inventors: John Kelly, Cork (IE); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 215 days.

(21) Appl. No.: 15/618,765

(22) Filed: Jun. 9, 2017

(65) Prior Publication Data

US 2018/0359258 A1 Dec. 13, 2018

(51) Int. Cl.
*H04L 29/06* (2006.01)
*G06F 9/451* (2018.01)

(52) U.S. Cl.
CPC .......... *H04L 63/101* (2013.01); *G06F 9/452* (2018.02); *H04L 63/105* (2013.01)

(58) Field of Classification Search
None
See application file for complete search history.

(56) References Cited

U.S. PATENT DOCUMENTS

| | | | | |
|---|---|---|---|---|
| 2005/0204143 A1* | 9/2005 | Ellington | ............... | G06F 21/31 713/182 |
| 2006/0230105 A1* | 10/2006 | Shappir | ................... | H04L 67/08 709/203 |
| 2012/0005670 A1 | 1/2012 | Driesen et al. | | |
| 2013/0007465 A1* | 1/2013 | Movassaghi | .......... | H04L 63/105 713/186 |

(Continued)

FOREIGN PATENT DOCUMENTS

EP 2 336 886 A2 6/2011

OTHER PUBLICATIONS

Gartner, Inc., Magic Quadrant for Identity and Access Management, Worldwide, Gregg Kreizman and Neil Wynne, Okta, Jun. 6, 2016, pp. 1-2; https://www.okta.com/resources/idaas-leader-gartner-magic-quadrant/.

*Primary Examiner* — Shin-Hon (Eric) Chen
(74) *Attorney, Agent, or Firm* — Larson Newman, LLP

(57) ABSTRACT

A virtual desktop system includes a directory service system and an access device. The directory service system include a group list, each group including a list of authorized users and an associated privilege level. The access device includes privilege logic to implement privilege levels, each privilege level being associated with one of the groups. The access device is only permitted to log on to the directory service to the exclusion of other functions of the access device until the access device receives an indication of a particular group from the directory service. The directory service receives a log on from a user of the access device, authenticates the (Continued)

user as being associated with the particular group, and sends the indication to the access device. The privilege logic enables the other functions of the access device in accordance with the privilege level associated with the particular group.

20 Claims, 3 Drawing Sheets

(56) References Cited

U.S. PATENT DOCUMENTS

| | | | | |
|---|---|---|---|---|
| 2013/0340063 | A1* | 12/2013 | Larsson | G06F 21/335 |
| | | | | 726/9 |
| 2014/0366093 | A1* | 12/2014 | Oh | G06F 9/45533 |
| | | | | 726/3 |
| 2015/0113528 | A1* | 4/2015 | Kim | G06F 9/452 |
| | | | | 718/1 |
| 2016/0134616 | A1* | 5/2016 | Koushik | H04L 63/0807 |
| | | | | 726/9 |
| 2016/0210446 | A1* | 7/2016 | Hamlin | G06F 21/31 |
| 2017/0171214 | A1* | 6/2017 | Anderson | G06F 16/27 |
| 2017/0185437 | A1* | 6/2017 | Thomas | G06F 9/45558 |
| 2018/0103062 | A1* | 4/2018 | White | H04L 63/104 |

* cited by examiner

SYSTEM AND METHOD FOR USER AUTHORIZATION IN A VIRTUAL DESKTOP ACCESS DEVICE USING AUTHENTICATION AND AUTHORIZATION SUBSYSTEMS OF A VIRTUAL DESKTOP ENVIRONMENT

FIELD OF THE DISCLOSURE

This disclosure generally relates to information handling systems, and more particularly relates to user authorization in a virtual desktop access device using authentication and authorization subsystems of a virtual desktop environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A virtual desktop system can include a directory service system and an access device. The directory service system can include a group list. Each group can include a list of authorized users and an associated privilege level. The access device can include privilege logic to implement privilege levels. Each privilege level can be associated with one of the groups. The access device may only be permitted to log on to the directory service to the exclusion of other functions of the access device until the access device receives an indication of a particular group from the directory service. The directory service can receive a log on from a user of the access device, authenticate the user as being associated with the particular group, and send the indication to the access device. The privilege logic can enable the other functions of the access device in accordance with the privilege level associated with the particular group.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
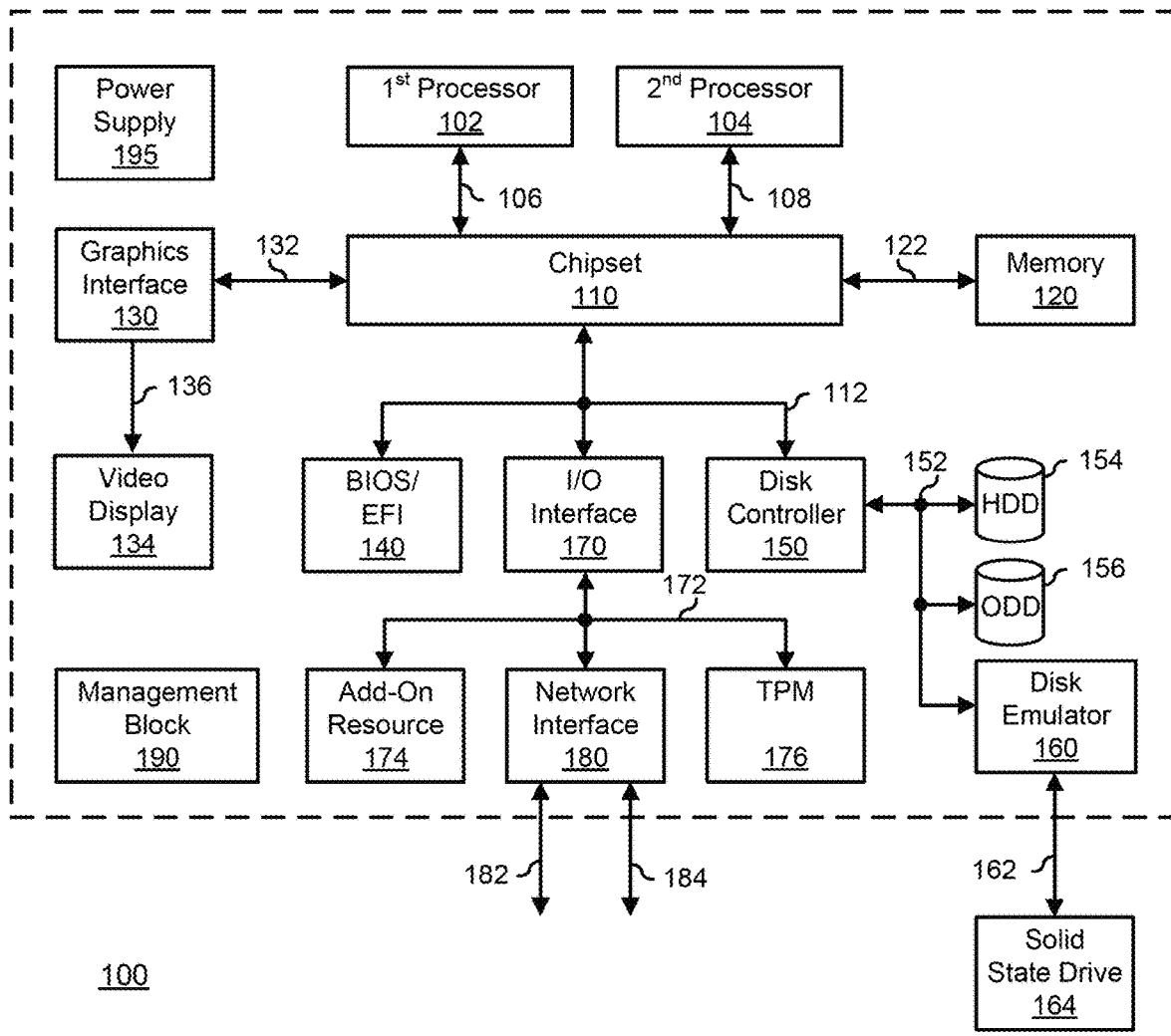
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
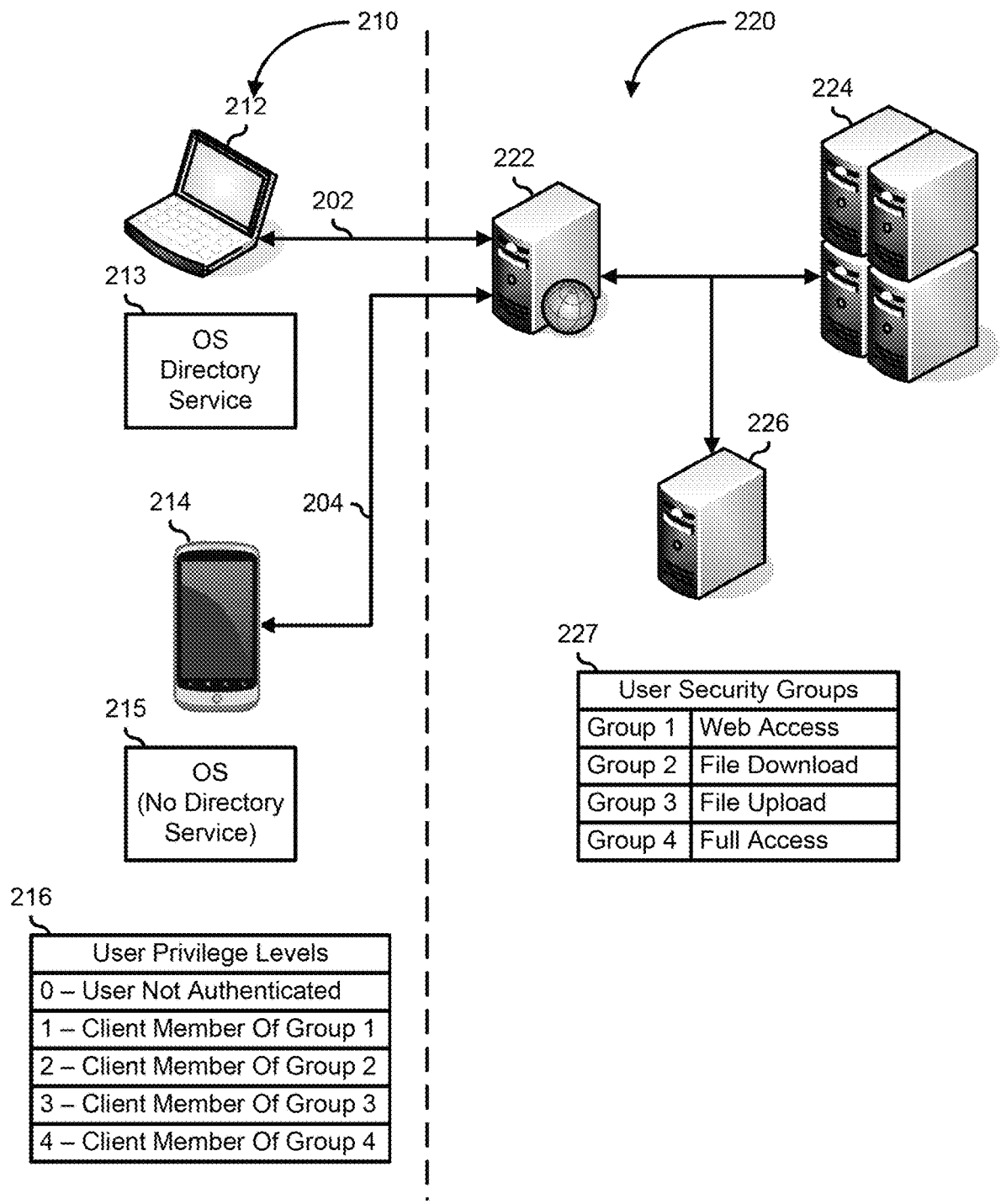
FIG. 2 illustrates a virtual desktop environment configured to provide user authentication and authorization from an access device according to an embodiment of the present disclosure.

FIG. 2 illustrates a virtual desktop environment 200 that can be implemented as one or more information handling systems similar to information handling system 100. Virtual desktop environment 200 includes a user environment 210 and a virtual desktop infrastructure (VDI) 220. User environment 210 includes access devices 212 and 214. VDI 220 includes a virtual desktop manager 222, a virtualization host 224, and a directory service manager 226. Virtual desktop environment 200 operates to present a remotely operated and maintained operating system environment and application software to access devices 212 and 214. In particular, when a user of one of access devices 212 and 214 logs on to VDI 220, virtual desktop manager 222 assesses directory service availability on the access device, determines the operating system environment and application software needs of the access device, and directs virtualization host 224 to instantiate a virtual machine that is associated with the access device, and that runs the operating system environment and application software. Virtualization host 224 includes a virtual machine manager (VMM) that operates to manage the virtual machines. Thus when a user of access device 212 logs on to VDI 220, virtual desktop manager 222 directs virtualization host 224 to instantiate a virtual machine associated with the user. Similarly, a virtual machine is instantiated when another user logs on to VDI 220 with either of access devices 212 or 214.

In a particular embodiment, two or more of the virtual machines are instantiated from a common image, such that each of the virtual machines is utilizing the same operating system environment and application software. In this way, any patches, modifications, or upgrades that are applied to the common image are thereby promulgated to the virtual machines associated with the users of access devices 212 and 214 that are using the common image. In this way, the cost of maintenance and service for virtual desktop environment 200 is reduced over maintaining separate operating system environments and application software for each of the users of access devices 212 and 214 systems. By using the common image, each of the users of access devices 212 and 214 can operate using the same operating system environment and application software, without regard to what type of system each access device operates. In another embodiment, one or more of the virtual machines is instantiated from a different image, such that the virtual machine is utilizing a different operating system environment or application software.

In a particular embodiment, users of each of access devices 212 and 214 log on to VDI 220 over a protected network, such as a corporate wide-area network (WAN), local area network (LAN), intranet, or the like, such that the access devices have secure access to their respective virtual machines. In another embodiment, users of each of access devices 212 and 214 log on to VDI 220 over a public network, such as the Internet, a publicly accessible Wi-Fi network, or the like. Here, desktop manager 222 operates to ensure that access devices 212 and 214 have secure access to their respective user's virtual machines. For example, desktop manager 222 can operate to provide a virtual private network (VPN) or another secure communication channel to access devices 212 and 214. In this way, accessibility to each user through each access device to their respective operating system environments and application software is available from remote locations and through a wide array of connected devices. In yet another embodiment, each of the users of access devices 212 and 214 have the option of using a protected network or a public network.

In a particular embodiment, the virtual machines remain instantiated on virtualization host 224 when the users of respective access devices 212 and 214 log off of their virtual desktop. Here, a particular user can be provided with unique access to their own virtual desktop, such that any changes made, such as to personalize the virtual desktop, are maintained after logging off and later logging back on in a later session. However, in this embodiment, virtualization host 224 incurs an overhead by keeping the virtual machines instantiated, even when no access device 212 or 214 is logged on. In another embodiment, the virtual machines remain instantiated on virtualization host 224 when the users of respective access devices 212 and 214 log off of their virtual desktop. However, here no particular access device is associated with a particular virtual desktop, and each time a user logs back on, the virtual desktop is unchanged from the previous session. In this embodiment, virtualization host 224 can keep one or more of the virtual machines instantiated, and then can instantiate additional virtual machines as the number of users increases. For example, in this way a data center can allocate processing resources of virtualization host 224 to running virtual desktops during business hours, and can allocate the processing resources to other tasks during the off hours.

Virtual desktop manager 222 operates to manage the connections between access devices 212 and 214 and VDI 220, including authentication, access device locations, session state, timeouts, and the like. In the embodiment where the virtual machines remain instantiated, virtual desktop manager 222 operates to manage the unused virtual machines, and assign a virtual machine to a user of an access device when a new user logs on to VDI 220. In the embodiment where the virtual machines are dynamically instantiated on virtualization host 224, desktop manager 222 operates to determine when to instantiate new virtual machines, or to halt existing virtual machines.

Access device 212 represents an information handling system operated by a user who has access to the resources of VDI 220. In particular, when a user of access device 212 is authenticated onto VDI 220 by virtual desktop manager 222, a virtual machine associated with the user provides a virtualized desktop environment that is displayed on the access device over a secure connection 202. The user interacts with access device 212 to perform computing tasks via the virtualized desktop environment on the instantiated virtual machine. The computing tasks can include interacting with a web browser, an office productivity suite, a database or spreadsheet application, programing interfaces, CAD or design simulation suites, or other computing tasks as may typically be performed in a standalone information handling system. In addition to interacting with the virtualized desktop environment to perform the computing tasks, access device 212 includes an operating system with an integrated directory service 213 that interacts with the directory service manager 226 to provide authenticated access to various resources, such as directories, files, processes or other resources. In particular, the user of access device 212 will be granted certain privileges and access levels to the resources of VDI 220, based upon the user's needs, and the user's authentication credentials, as verified by desktop manager 222. Secure connection 202 can include a virtual private network (VPN) tunnel, a secure hypertext transfer protocol (HTTPS) connection, or another secure connection, as needed or desired.

Thus, one user may be granted access to their associated virtualized desktop environment to perform computing tasks wholly within VDI 220, and directory service manager 226 operates to provide access to various directories, files, processes, or other resources to the virtualized desktop environment, as permitted by the user's privileges and access levels, but will not be permitted to download or upload files to the VDI. Thus the user may, for example, use a web browser in the virtualized desktop environment to download information from the Internet, but the information will remain within the virtualized desktop environment, and will not be accessible to the access device when not logged in to VDI 220. Another user may be granted access to their associated virtualized desktop environment to perform computing tasks within VDI 220, and may also be granted the privilege to download information from the VDI. Here, directory service manager 226 again operates to provide access as permitted by the user's privileges and access levels, and will also permit information to be downloaded from VDI 200. Thus where the user accesses the web browser in the virtualized desktop environment to download information from the Internet, the user may further direct VDI 220 to download the information to the access device for access by the user when not logged in to the VDI. Yet another user may be granted access to their associated virtualized desktop environment, and may also be permitted to both download and upload information. Here, directory service manager 226 again operates to provide access as permitted by the user's privileges and access levels, and will also permit information to be downloaded or uploaded. For example, a user may download a file while logged on to VDI 220, log off of the VDI and modify the file while logged off, and later log back on and upload the modified file to the VDI. Finally, a user may be granted full administrative access to VDI 220, such that the user is permitted to modify the configuration and operation of the VDI itself. Here, directory service manager 226 again operates to provide access as permitted by the user's privileges and access levels, will permit information to be downloaded or uploaded, and will permit administrative access to VDI 200.

Access device 214 represents an information handling system operated by a user who has access to the resources of VDI 220. The user may be the same user as the user of access device 212, or may be a different user. Here, when the user of access device 214 is authenticated onto VDI 220 by virtual desktop manager 222, a virtual machine associated with the user provides a virtualized desktop environment that is displayed on the access device over a secure connection 204, and the user interacts with the access device to perform computing tasks via the virtualized desktop environment on the instantiated virtual machine. In addition to interacting with the virtualized desktop environment to perform the computing tasks, access device 214 includes an operating system 215 without an integrated directory service to interact with the directory service manager 226. As such, operating system 215 is unable to receive authenticated access to various resources of VDI 220. An example of access device 214 that includes OS 215 that does not include an integrated directory service includes a mobile wireless device, such as a smart phone, a tablet device, or the like, a thin client device, or another device, and can include devices with operating systems such as a mobile device OS like Android or iOS, a thin Linux OS, a thin client Windows OS, or the like.

Access device 214 further includes a user privilege module 216 that operates to modify the operation of the access device/OS 215. In particular, user privilege module 216 operates to implement several privilege levels for users of access device 214, based upon the authentication and authorization functions of VDI 220. Here, because OS 215 lacks a native capacity to interact with directory service manager 226, access device 214 is unable to authorize the user to access the various tiered levels of functionality, as described above, on the access device. However, by using the authentication functions of VDI 220, the VDE allocates a user of access device 214 to a particular user security group that is associated with the user's privilege level on the VDE, and provides an indication to the access device as to the user's privilege level. In particular, when the user of access device 214 logs on to VDI 220, desktop manager 222 passes the user's authentication credentials to directory service manager 226, and the directory service manager determines a user security group that the user is associated with. In particular, directory service manager 226 implements a set of user security groups 227 that associate various groups of users with a particular access level of the resources and services of VDI 220. Upon determining the user's user security group, directory service manager 226 then issues an indication to access device 214, indicating the user security group that the user is associated with, and user privilege module 216 operates to permit or deny the access device from performing various activities consistent with the indicated user security group. In this way, access device 214 is enabled to interact more fully with VDI 220, even in the absence of a robust authentication system or native directory service support. Note that the indication of the user security group that the user is associated with is provided by directory service manager 226 to access device 214 through a channel of the virtual desktop protocol, and no file sharing mechanism is utilized in providing the indication.

In a particular embodiment, user security groups 227 include a first group of users, group 1, that are associated with a "web access" privilege level, a second group of users, group 2, that are associated with a "file download" privilege level, a third group of users, group 3, that are associated with a "file upload" privilege level, and a fourth group of users, group 4, that are associated with a "full access" privilege level. The details of the access capabilities on access device 216, as dictated by the privilege levels, will be described further, below. Note that as illustrated, directory service manager 226 implements four privilege levels, but this is not necessarily so, and a smaller number or a greater number of groups and privilege levels may be implemented as needed or desired. Further, it is assumed herein that a higher privilege level incorporates access to the resources and functions of VDI 220 of each lower privilege level, but this is not necessarily so, and groups and privilege levels can be defined that each provide a unique mix of access to the resources and functions of the VDI, as needed or desired.

The privilege levels implemented by user privilege module 216 include levels 0, 1, 2, 3, and 4. Level 0 is an authentication level in which the user of access device 214 is not yet authenticated at any level onto VDI 220. Here, in a particular embodiment, at level 0, all activities on access device 214 are locked, except that a user interface is enabled that permits the user to log on to VDI 220, for example by permitting a web-based application to only access a Universal Resource Identifier (URI) of a web portal of the desktop manager 222. In another embodiment, such as where access device 216 represents a smart phone or tablet device, at level 0, the access device is permitted to access particular applications, such as a web browser for general purposes, but may be restricted as to the ability to perform uploads and downloads, and as to the ability to add, remove, or update applications on the access device. Level 1 is an authentication level which indicates that the user of access device 214 is authenticated onto VDI 220 as a member of group 1 of user security groups 227. As such, access device 214 operates to permit the user of the access device to perform web-based operations on a web portal provided by VDI 220, but the access device blocks all file transfers, either downloads or uploads, and also blocks administrative access to the VDI. Level 2 is an authentication level which indicates that the user of access device 214 is authenticated onto VDI 220 as a member of group 2 of user security groups 227. As such, access device 214 operates to permit the user to perform the activities associated with group 1, and to download information from VDI 220, but the access device still blocks all uploads and administrative access to the VDI. Level 3 is an authentication level which indicates that the user of access device 214 is authenticated onto VDI 220 as a member of group 3 of user security groups 227. As such, access device 214 operates to permit the user of perform the activities of group 2, and to upload information to VDI 220, and the access device still blocks administrative access to the VDI. Level 4 is an authentication level which indicates that the user of access device 214 is authenticated onto VDI 220 as a member of group 4 of user security groups 227. As such, access device 214 operates to permit the user to perform the activities associated with group 3, and to access administrative functions and features of VDI 220. For example, when access device 214 is operating as authenticated onto VDI 220 as a member of group 4 of user security groups 227, then the user of the access device may be permitted to modify the access device itself, such as by adding, modifying, or removing an application on the access device, modifying a setting of the access device, or the like.

Figure 3:
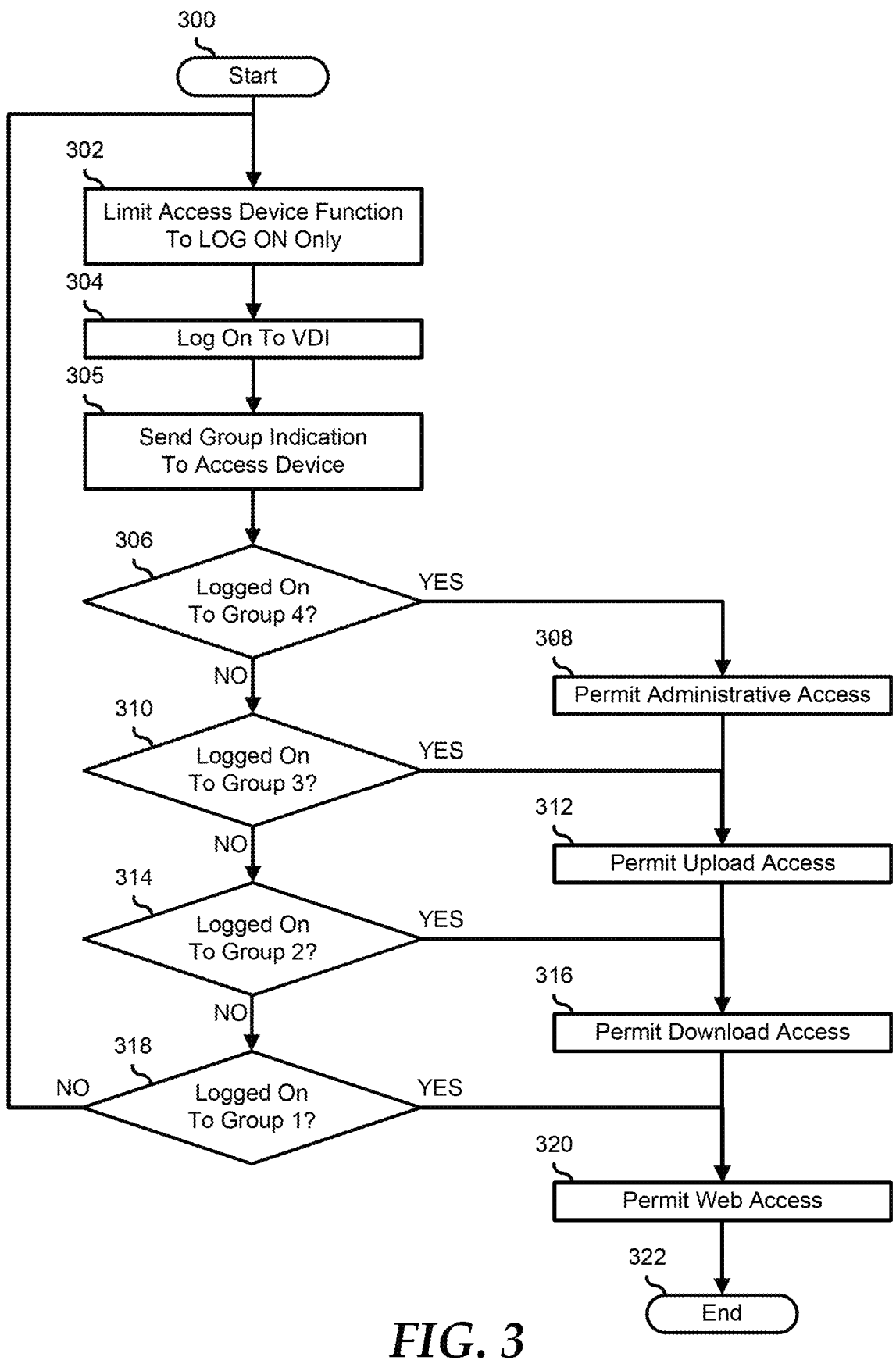
FIG. 3 illustrates a method for user authentication and authorization to a virtual desktop environment from an access device according to an embodiment of the present disclosure.

FIG. 3 illustrates a method for providing user authorization in a virtual desktop access device using authentication and authorization subsystems of a virtual desktop environment, starting at block 300. An access device, such as access device 214, is limited as to its device function, such that the access device can only log on to a VDI in block 302. A user of the access device uses the access device to log on to the VDI in block 304, and the VDI authenticates the user as being a member of one of four user groups as established by the VDI. For example, directory service manager 226 can include user security groups 227 that list various users and the access privileges that are permitted to each group. The VDI determines if the user is a member of one of the four user groups, and if so, the VDI sends an indication to the access device as to which user group the user is a member in block 305. A decision is made as to whether or not the user is a member of group 4 in decision block 306. If not, the "NO" branch of decision block 306 is taken and the method proceeds to decision block 310 as described below. If the user is a member of group 4, the "YES" branch of decision block 306 is taken, the access device permits the user to perform administrative level accesses to the VDI in block 308, and the method proceeds to block 312 as described below.

When the "NO" branch of decision block 306 is taken, a decision is made as to whether or not the user is a member of group 3 in decision block 310. If not, the "NO" branch of decision block 310 is taken and the method proceeds to decision block 314 as described below. If the user is a member of group 3, the "YES" branch of decision block 310 is taken, the access device permits the user to upload content to the VDI in block 312, and the method proceeds to block 316 as described below. When the "NO" branch of decision block 310 is taken, a decision is made as to whether or not the user is a member of group 2 in decision block 314. If not, the "NO" branch of decision block 314 is taken and the method proceeds to decision block 318 as described below. If the user is a member of group 2, the "YES" branch of decision block 314 is taken, the access device permits the user to download content from the VDI in block 316, and the method proceeds to block 320 as described below. When the "NO" branch of decision block 314 is taken, a decision is made as to whether or not the user is a member of group 1 in decision block 318. If not, the "NO" branch of decision block 318 is taken and the method returns to block 302 where the access device is limited as to its device function, such that the access device can only log on to the VDI. If the user is a member of group 1, the "YES" branch of decision block 318 is taken, the access device permits the user to browse web-based content of the VDI in block 320, and the method ends at block 322.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A virtual desktop system, comprising:
a virtual desktop infrastructure including:
a virtualization system configured to provide a plurality of host processing functions; and
a directory service system including a group list having a plurality of host groups, each host group including a list of authorized users and an associated set of the host processing functions for the authorized users within the particular host group; and
an access device configured to provide a plurality of device processing functions, each device processing function being associated with a particular one of the host processing functions, the access device including privilege logic having a plurality of device groups, each device group being associated with a particular one of the host groups and including an associated set of the device processing functions, each set of device processing functions being associated with a set of host processing functions accessible to the associated host group;
wherein:
the directory service receives a log on from a user of the access device, authenticates the user as being associated with a particular host group, and sends an indication to the access device that the user is associated with the particular host group; and
the privilege logic determines a particular device group associated with the particular host group based upon the indication, and enables the access device to execute only a particular set of device processing functions associated with the particular device group on the virtualization system.

2. The virtual desktop system of claim 1, wherein:
the plurality of host groups comprises a first host group having a first list of authorized users that are associated with granting web-based access to the virtualization system; and
when the indication includes the first host group, the privilege logic enables the access device to perform web-based access to the virtualization system.

3. The virtual desktop system of claim 2, wherein:
the plurality of host groups comprises a second host group having a second list of authorized users that are associated with granting downloads from the virtualization system; and
when the indication includes the second host group, the privilege logic enables the access device to perform downloads from the virtualization system.

4. The virtual desktop system of claim 3, wherein:
the plurality of groups comprises a third host group having a third list of authorized users that are associated with granting uploads to the virtualization system; and
when the indication includes the third host group, the privilege logic enables the access device to perform uploads to the virtualization system.

5. The virtual desktop system of claim 4, wherein:
the plurality of groups comprises a fourth host group having a fourth list of authorized users that are associated with granting administrative access to the virtualization system; and
when the indication includes the fourth host group, the privilege logic enables the access device to perform administrative access to the virtualization system.

6. The virtual desktop system of claim 5, wherein in enabling the access device to perform administrative access to the virtualization system, the privilege logic enables an application on the access device to be changed.

7. The virtual desktop system of claim 6, wherein in enabling the application to be changed, the privilege logic permits the application to be added to the access device, removed from the access device, or modified.

8. The virtual desktop system of claim 5, wherein in enabling the access device to perform administrative access to the virtualization system, the privilege logic enables a setting of the access device to be changed.

9. The virtual desktop system of claim 1, wherein an operating system of the access device does not support a directory service.

10. The virtual desktop system of claim 1, wherein the access device comprises a smart phone.

11. A method, comprising:
providing, by a directory service system of a virtual desktop system, a group list having a plurality of host groups, each host group including a list of authorized users and an associated set of host processing functions on a virtualization system for the authorized users within the particular host group;
providing, on an access device of the virtual desktop system, a plurality of device processing functions, each device processing function being associated with a particular one of the host processing functions;
providing, on the access device, privilege logic having a plurality of device groups, each device group being associated with a particular one of the host groups and including an associated set of the device processing functions, each set of device processing functions being associated with a set of host processing functions accessible to the associated host group;
receiving, by the directory service system, a log on from a user of the access device;
authenticating, by the directory service system, the user as being associated with a particular host group;
sending, by the directory service system, an indication to the access device that the user is associated with the particular host group;
determining a particular device group associated with the particular host group based upon the indication, and
enabling, by the privilege logic, the access device to execute only a particular set of device processing functions associated with the particular device group on the virtualization system.

12. The method of claim 11, wherein:
the plurality of host groups comprises a first host group having a first list of authorized users that are associated with granting web-based access to the virtualization system; and
when the indication includes the first first group, the method further comprises enabling, by the privilege logic, the access device to perform web-based access to the virtualization system.

13. The method of claim 12, wherein:
the plurality of host groups comprises a second host group having a second list of authorized users that are associated with granting downloads from the virtualization system; and
when the indication includes the second host group, the method further comprises, enabling, by the privilege logic, the access device to perform downloads from the virtualization system.

14. The method of claim 13, wherein:
the plurality of host groups comprises a third host group having a third list of authorized users that are associated with granting uploads to the virtualization system; and
when the indication includes the third host group, the method further comprises enabling, by the privilege logic, the access device to perform uploads to the virtualization system.

15. The method of claim 14, wherein:
the plurality of host groups comprises a fourth host group having a fourth list of authorized users that are associated with granting administrative access to the virtualization system; and
when the indication includes the fourth host group, the method further comprises enabling, by the privilege logic, the access device to perform administrative access to the virtualization system.

16. The method of claim 15, wherein in enabling the access device to perform administrative access to the virtualization system, the method further comprises enabling, by the privilege logic, an application on the access device to be changed.

17. The method of claim 16, wherein in enabling the application to be changed, the method further comprises permitting, by the privilege logic, the application to be added to the access device, removed from the access device, or modified.

18. The method of claim 15, wherein in enabling the access device to perform administrative access to the virtualization system, the method further comprises enabling, by the privilege logic, an a setting of the access device to be changed.

19. The method of claim 18, wherein an operating system of the access device does not support a directory service.

20. An access device for a virtual desktop system, the access device configured to provide a plurality of device processing functions, each device processing function being associated with a host processing function of a virtualization system of the virtual desktop system, the access device comprising:
a processor; and
a memory for storing code;
wherein the processor is configured to:
implement privilege logic having a plurality of device groups each device group being associated with a particular host group provided on a directory service of the virtual desktop system, each device group including an associated set of the device processing functions, each set of device processing functions being associated with a set of host processing functions accessible to the associated host group;
log on to the directory service;
receive an indication that a user associated with the log on to the directory service is associated with a particular host group; and
enables the access device to execute only a particular set of device processing functions associated with the particular device group on the virtualization system.

* * * * *